(12) United States Patent
Panda et al.

(10) Patent No.: US 10,644,948 B1
(45) Date of Patent: May 5, 2020

(54) HYPERVISOR DETECTION OF VIRTUAL MACHINE AND NETWORK INTERFACE COMPATIBILITY

(71) Applicant: Juniper Networks, Inc., Sunnyvale, CA (US)

(72) Inventors: Pravas Kumar Panda, Bangalore (IN); Bineet Kumar, Giridih (IN); Rajashekhar T. Reddy, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 184 days.

(21) Appl. No.: 15/689,719

(22) Filed: Aug. 29, 2017

(51) Int. Cl.
*H04L 29/08* (2006.01)
*H04L 12/24* (2006.01)
*G06F 9/455* (2018.01)
*G06F 9/50* (2006.01)

(52) U.S. Cl.
CPC ...... *H04L 41/0873* (2013.01); *G06F 9/45558* (2013.01); *G06F 9/5077* (2013.01); *G06F 2009/45595* (2013.01)

(58) Field of Classification Search
CPC .................................................. H04L 41/0873
See application file for complete search history.

(56) References Cited

U.S. PATENT DOCUMENTS

| 8,108,882 B1* | 1/2012 | Haynes, Jr. ........... G06F 13/102 709/230 |
| 2008/0126785 A1* | 5/2008 | Chong ................... G06F 9/4401 713/2 |
| 2012/0331461 A1* | 12/2012 | Fries ................... H04L 67/2861 718/1 |

FOREIGN PATENT DOCUMENTS

CN          102790777 B     6/2016

* cited by examiner

*Primary Examiner* — Adnan M Mirza
(74) *Attorney, Agent, or Firm* — Harrity & Harrity, LLP

(57) ABSTRACT

A device may receive information associated with a set of types of virtual network interface cards (vNICs). A hypervisor, of the device, being capable of connecting a vNIC, to a virtual bus, to connect a virtual machine, of the device, to a network. The device may connect the vNIC, to the virtual bus, based on the information associated with the set of types of vNICs. The vNIC being associated with a type of the set of types. The device may determine whether the virtual machine is compatible with the vNIC based on connecting the vNIC to the virtual bus. The device may selectively connect another vNIC, to the virtual bus, based on determining whether the virtual machine is compatible with the vNIC.

20 Claims, 8 Drawing Sheets

HYPERVISOR DETECTION OF VIRTUAL MACHINE AND NETWORK INTERFACE COMPATIBILITY

BACKGROUND

Network functions virtualization (NFV) is a network architecture concept that uses the technologies of information technology virtualization to virtualize entire classes of network device functions into building blocks that can connect, or chain together, to create communication services. A virtualized network function (vNF) can include a function that is implemented by a set of virtual machines executing different software and processes on top of high-volume servers, switches, storage devices, cloud computing infrastructure, and/or the like. A vNF might not require dedicated and proprietary hardware devices.

SUMMARY

According to some possible implementations, a device may include one or more processors to receive information associated with a set of types of virtual network interface cards (vNICs), a hypervisor, of the device, being capable of connecting a vNIC, to a virtual bus, to connect a virtual machine, of the device, to a network; connect the vNIC, to the virtual bus, based on the information associated with the set of types of vNICs, the vNIC being associated with a type of the set of types; determine whether the virtual machine is compatible with the vNIC based on connecting the vNIC to the virtual bus; and selectively connect another vNIC, to the virtual bus, based on determining whether the virtual machine is compatible with the vNIC, the other vNIC being associated with another type of the set of types, and the other type being different than the type.

According to some possible implementations, a non-transitory computer-readable medium may store one or more instructions that, when executed by one or more processors of a device, cause the one or more processors to receive information associated with an order that identifies a set of types of virtual network interface cards (vNICs), a hypervisor, associated with the device, being capable of connecting a vNIC, to a virtual bus, to permit a virtual machine, of the device, to connect to a network; connect vNIC to the virtual bus based on the order, the vNIC being associated with a type of the set of types; determine whether the virtual machine is compatible with the vNIC after connecting the vNIC to the virtual bus; selectively connect another vNIC to the virtual bus based on the order and based on determining whether the virtual machine is compatible with the vNIC, the other vNIC being associated with another type of the set of types, and the other type being different than the type.

According to some possible implementations, a method may include receiving, by a hypervisor of a device, information associated with a set of types of virtual devices, the hypervisor being capable of connecting a virtual device, to a virtual bus, to permit a virtual machine, of the device, to connect to a network; connecting, by the hypervisor of the device, the virtual device to the virtual bus based on the information associated with the set of types of virtual devices, the virtual device being associated with a type of the set of types; determining, by the hypervisor of the device, whether the virtual machine is compatible with the virtual device; and selectively connecting, by the hypervisor of the device, another virtual device to the virtual bus based on determining whether the virtual machine is compatible with the virtual device, the other virtual device being associated with another type of the set of types, and the other type being different than the type.

DETAILED DESCRIPTION

Figure 1A:
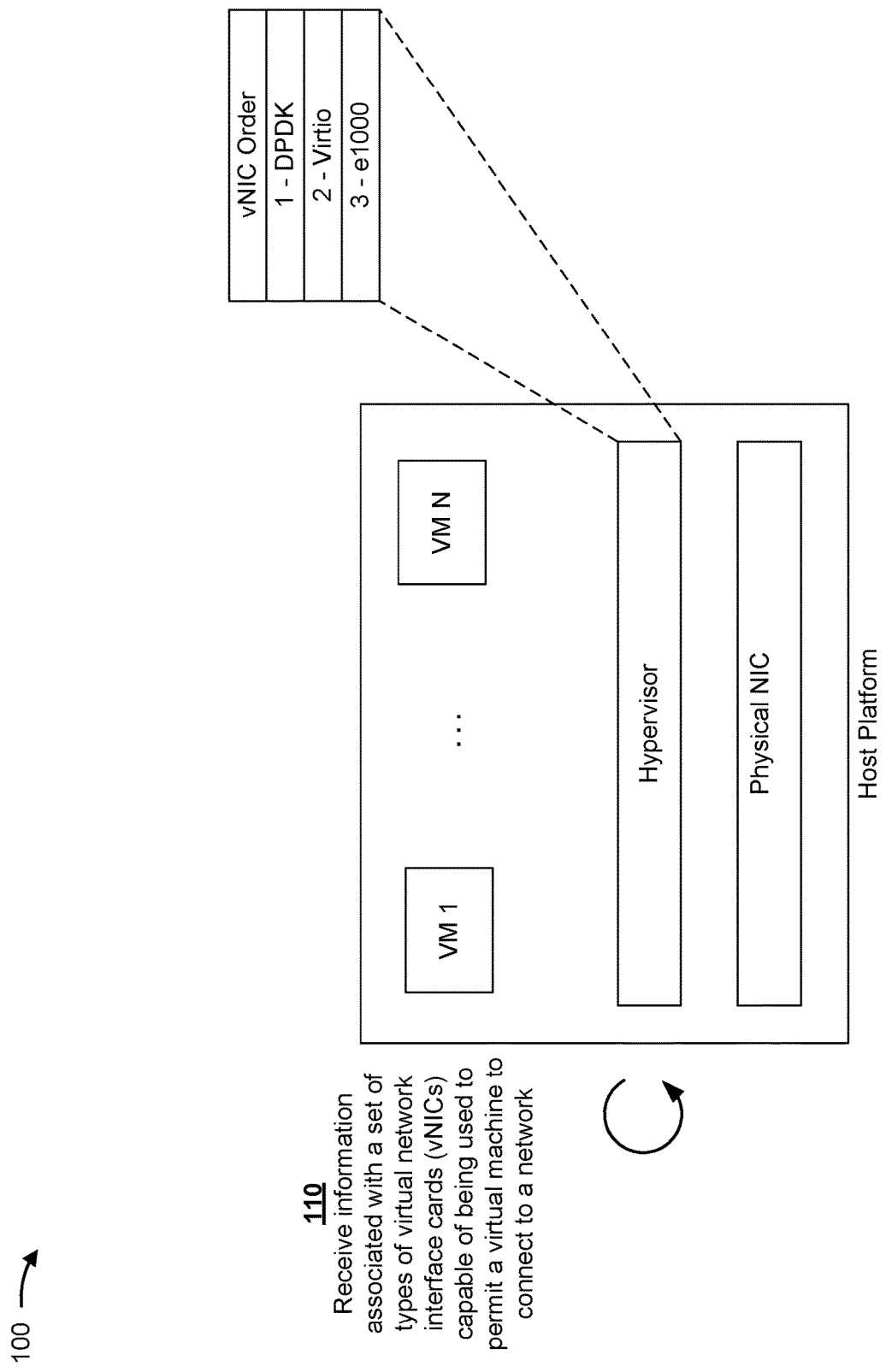
FIGS. 1A-1E are diagrams of an overview of an example implementation described herein.

The following detailed description of example implementations refers to the accompanying drawings. The same reference numbers in different drawings may identify the same or similar elements.

In virtualized computing environments, a vNF can be implemented by a set of virtual machines instead of proprietary and/or dedicated hardware. NFV permits more efficient service chaining by moving network functions and/or services into software rather than requiring dedicated hardware.

As used herein, "hypervisor" and "host kernel" may be used interchangeably. To implement and/or permit a vNF, a hypervisor of a host platform might attempt to connect a virtual machine, of the host platform, to a virtual network and/or a physical network. For example, a virtual network can refer to a network that includes a set of virtual machines that are being executed by a particular host platform, and a physical network can refer to a network that includes other devices that are physically connected to the host platform. By permitting a virtual machine to connect to a network (e.g., a virtual network and/or a physical network), the hypervisor permits vNFs and service chaining.

The hypervisor can connect a virtual network interface card (vNIC), to a virtual bus, to permit the virtual machine to connect to a network. For example, a vNIC can connect to a virtual network device, and the virtual network device can permit interconnection of multiple virtual machines of a host platform. Additionally, a vNIC can connect to a physical NIC of the host platform, and the physical NIC can permit the virtual machine to connect to an external network.

In some cases, a hypervisor might connect, to a virtual bus, vNICs that are of different types. For example, a hypervisor might connect, to a virtual bus, a first type of vNIC according to data plane development kit (DPDK) specifications. DPDK is a set of data plane libraries and NIC drivers for fast packet processing. Additionally, the hypervisor might connect, to a virtual bus, a second type of vNIC according to Virtio specifications. Virtio is a virtualization standard for network device and disk device drivers. While DPDK and Virtio are provided as examples, it should be understood that multiple types of vNICs are capable of being connected, to a virtual bus, by a hypervisor, such as e1000 vNICs, gopacket vNICs, vhost vNICs, thunderx vNICs, and/or the like.

In some cases, different types of vNICs might include and/or support different features. For example, features can include jumbo frame capability, promiscuous mode capability, media access control (MAC) filtering capability, rate limitation capability, checksum offloading capability, and/or the like. Additionally, different types of vNICs might implement different network traffic processing techniques, might utilize different types of data structures, and/or the like. As such, different types of vNICs might consume different amounts of processor and/or memory resources of a host platform.

In some cases, different types of vNICs might permit different network metric values associated with network traffic transfer. For example, different types of vNICs might permit network traffic to be transferred in association with different throughput values, bandwidth values, goodput values, latency values, jitter values, delay values, and/or the like. As such, a network operator might desire that a particular type of vNIC be used to connect virtual machines to a network, such that particular features are supported, and/or that particular network metric values are supported. Additionally, the network operator might configure a hypervisor to connect, to a virtual bus, vNICs of a particular type.

However, in some cases, a virtual machine might not support a particular type of vNIC that is connected, to a virtual bus, by the hypervisor. For example, the virtual machine might not include a particular vNIC driver that corresponds to the particular type of vNIC. As such, the virtual machine and the vNIC might not be compatible. In such cases, the virtual machine might not be capable of connecting to a network, thereby preventing implementation of a vNF and/or preventing service chaining.

In other cases, a virtual machine might support a first type of vNIC that is connected by the hypervisor, and might also support a second type of vNIC that is capable of being connected by the hypervisor. Assume that the second type of vNIC supports more features, consumes less processor and/or memory resources of the host platform, permits improved network metric values, and/or the like, as compared to the first type of vNIC.

In situations where the hypervisor connects, to a virtual bus, the first type of vNIC, the virtual machine can connect to a network using the first type of vNIC despite the ability to use the second type of vNIC for network connectivity. By using the first type of vNIC instead of the second type of vNIC, the virtual machine might consume more processor and/or memory resources of the host platform, might provide support for fewer features, might decrease throughput, might increase latency, and/or the like.

Some implementations described herein provide a hypervisor of a host platform that can automatically determine virtual machine and vNIC compatibility, and select a particular vNIC that is capable of being used by the virtual machine to connect to a network. In this way, some implementations described herein improve network performance of vNFs, conserve processor and/or memory resources of host platforms, reduce an amount of manual configuration of hypervisors, and/or the like.

FIGS. 1A-1E are diagrams of an overview of an example implementation 100 described herein. As shown in FIG. 1A, and by reference number 110, a hypervisor, of a host platform, may receive information associated with a set of types of virtual network interface cards (vNICs) capable of being used to permit a virtual machine to connect to a network. For example, the hypervisor may receive, from a set of configuration files, information associated with types of vNICs that the hypervisor is capable of connecting to a virtual bus, and information associated with an order in which the hypervisor is to connect the vNICs.

The hypervisor may connect, to a virtual bus, a vNIC to permit a virtual machine to use the vNIC to transfer network traffic associated with a network. For example, a virtual machine may connect to a virtual network (e.g., a network of virtual machines of the host platform) using the vNIC, and/or may connect to a physical network (e.g., a network of other devices and the host platform) using the vNIC and a physical NIC of the host platform. In this way, a virtual machine may implement a vNF by connecting to a virtual network and/or a physical network.

As shown in FIG. 1A, the order may indicate that the hypervisor is to connect, to a virtual bus, a DPDK vNIC (e.g., a Virtio vNIC that includes capabilities that support DPDK communication through a userspace) first, a Virtio vNIC second, and an e1000 vNIC third. In other words, the hypervisor may first attempt to connect a virtual machine to a network using a DPDK vNIC. In the event that the virtual machine does not include a DPDK vNIC driver and is therefore incompatible with the DPDK vNIC, then the hypervisor may attempt to connect the virtual machine to the network using a Virtio vNIC. Further, in the event that the virtual machine does not include a Virtio vNIC driver and does not include a DPDK vNIC driver, then the hypervisor may attempt to connect the virtual machine to the network using an e1000 vNIC.

The hypervisor might be capable of connecting, to a virtual bus, vNICs that are of particular types (e.g., DPDK, Virtio, e1000, etc.). However, virtual machines of the host platform might or might not include corresponding vNIC drivers. For example, a particular virtual machine might include a Virtio vNIC driver and/or might not include a DPDK vNIC driver. Additionally, different virtual machines of the host platform might include different sets of vNIC drivers. As such, virtual machines of the host platform might not be compatible with particular vNICs that the hypervisor connects to a virtual bus (e.g., because the virtual machines do not include corresponding vNIC drivers).

By connecting, to a virtual bus, vNICs and attempting to connect a virtual machine to the various vNICs based on the order, the hypervisor may automatically determine virtual machine and vNIC compatibility. For example, the hypervisor may iterate through the order in the event that the virtual machine is not compatible with one or more types of vNICs. As an example, if a virtual machine is not compatible with a DPDK vNIC, then the hypervisor may connect, to a virtual bus, a Virtio vNIC. Additionally, by connecting, to a virtual bus, vNICs based on the order, the hypervisor may first attempt to connect a virtual machine to a network using a type of vNIC that offers improved network performance (e.g., increased throughput, reduced latency, and/or the like) and/or consumes fewer processor and/or memory resources of the host platform than as compared to other types of vNICs that are of lower priority according to the order.

In this way, some implementations described herein reduce an amount of manual configuration associated with virtual network interface configuration by permitting the hypervisor to automatically determine virtual machine and vNIC compatibility. Additionally, some implementations described herein improve network performance of vNFs by permitting vNICs to be connected to a virtual bus based on a prioritized order. In this way, some implementations described herein conserve processor and/or memory resources of virtualized platforms and/or conserve network resources.

Figure 1B:
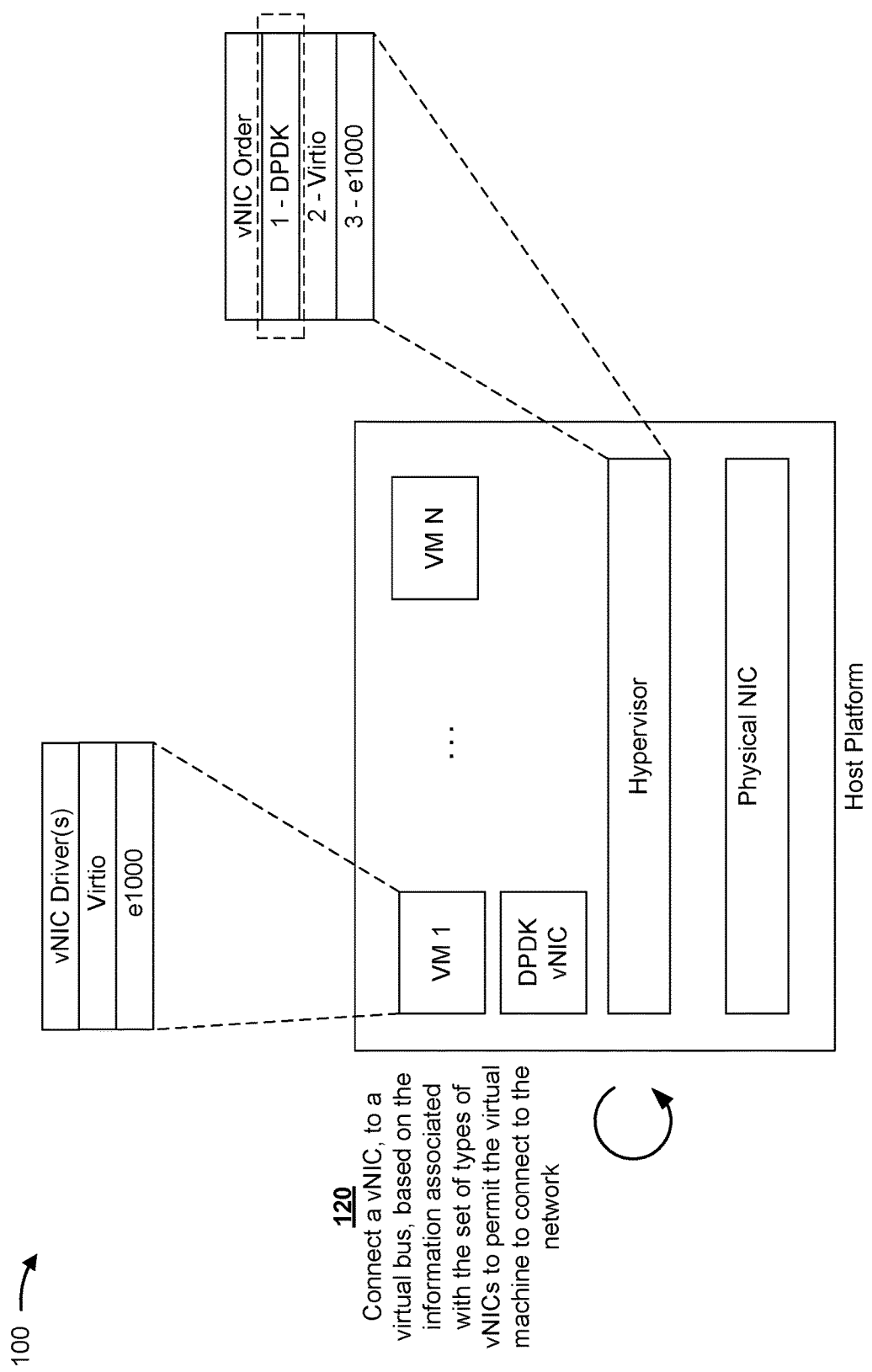

As shown in FIG. 1B, and by reference number 120, the hypervisor may connect, to a virtual bus, a vNIC based on the information associated with the set of types of vNICs to permit the virtual machine to connect to the network. For example, as shown, the hypervisor may first connect, to a virtual bus, a DPDK vNIC based on the order in which the hypervisor is to connect, to a virtual bus, vNICs. In some implementations, the hypervisor may connect, to a virtual bus, the DPDK vNIC and configure the DPDK vNIC such that the DPDK vNIC is compatible with DPDK vNIC drivers. In other words, the hypervisor may connect, to a virtual bus, the DPDK vNIC such that a virtual machine, that includes a DPDK vNIC driver, may configure the DPDK vNIC for use by the virtual machine and use the DPDK vNIC to transfer network traffic.

As shown, assume that a virtual machine (e.g., VM 1) includes a Virtio vNIC driver and an e1000 vNIC driver, and that the virtual machine does not include a DPDK vNIC driver. In this case, the virtual machine is not compatible with the DPDK vNIC. As such, the hypervisor may determine that the virtual machine is not compatible with the DPDK vNIC, as described below.

Figure 1C:
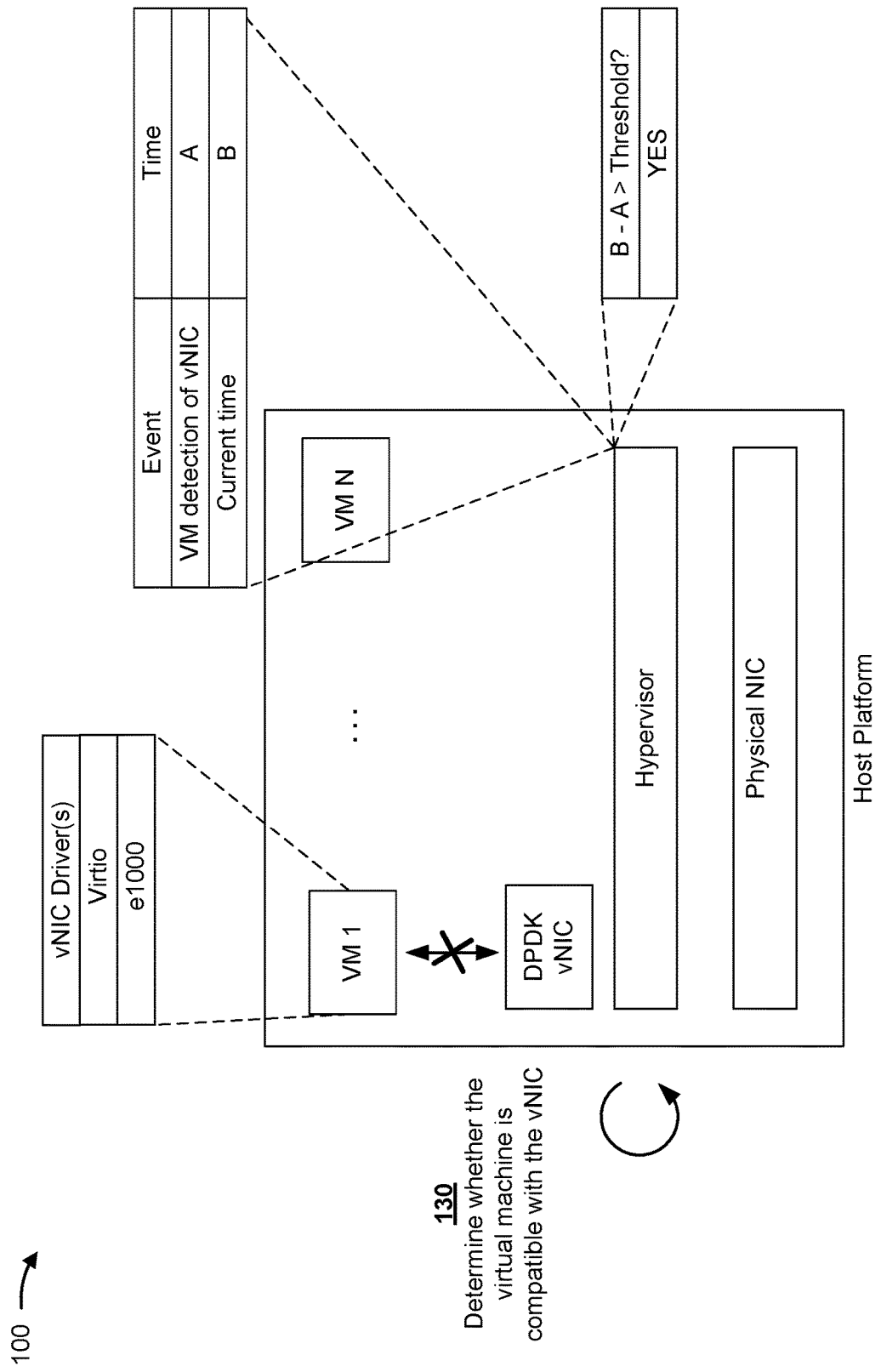

As shown in FIG. 1C, and by reference number 130, the hypervisor may determine whether the virtual machine is compatible with the vNIC. As shown, the hypervisor may detect a first event that corresponds to the virtual machine detecting the DPDK vNIC. For example, the virtual machine (e.g., a kernel of the virtual machine) may detect that the DPDK vNIC is connected to a virtual bus. Further, the virtual machine (e.g., the kernel of the virtual machine) may write to a set of registers (e.g., configuration space registers, and/or the like) of the DPDK vNIC to permit a set of vNIC drivers of the virtual machine to attempt to connect to the DPDK vNIC and/or configure the DPDK vNIC for use. The hypervisor may receive a notification that the virtual machine detected the DPDK vNIC, and may store information associated with a time stamp that corresponds to a time at which the virtual machine detected the DPDK vNIC (e.g., time A).

In some implementations, the hypervisor may determine whether a set of registers (e.g., configuration space registers, and/or the like) has been written to by the virtual machine (e.g., a vNIC driver of the virtual machine). In the situation where the hypervisor determines that the virtual machine has written to the set of registers, then the hypervisor may determine that the virtual machine is compatible with the vNIC. In the situation where the hypervisor determines that the virtual machine has not written to the set of registers, then the hypervisor may compare a current time and a time stamp that corresponds to the time at which the virtual machine detected the DPDK vNIC.

For example, as shown in FIG. 1C, the hypervisor may compare a current time (e.g., time B) and the time (e.g., time A) at which the virtual machine detected the DPDK vNIC. Further, as shown, the hypervisor may determine that a difference between the times satisfies a threshold amount of time.

In this way, the hypervisor may determine that the virtual machine is not compatible with the DPDK vNIC. For example, if the virtual machine was compatible with the DPDK vNIC (e.g., included a DPDK vNIC driver), then the virtual machine (e.g., a DPDK vNIC driver of the virtual machine) might have written to the set of registers within a particular amount of time that is less than the threshold amount of time. In this way, the hypervisor may connect, to a virtual bus, another type of vNIC based on the order, as described below.

Figure 1D:
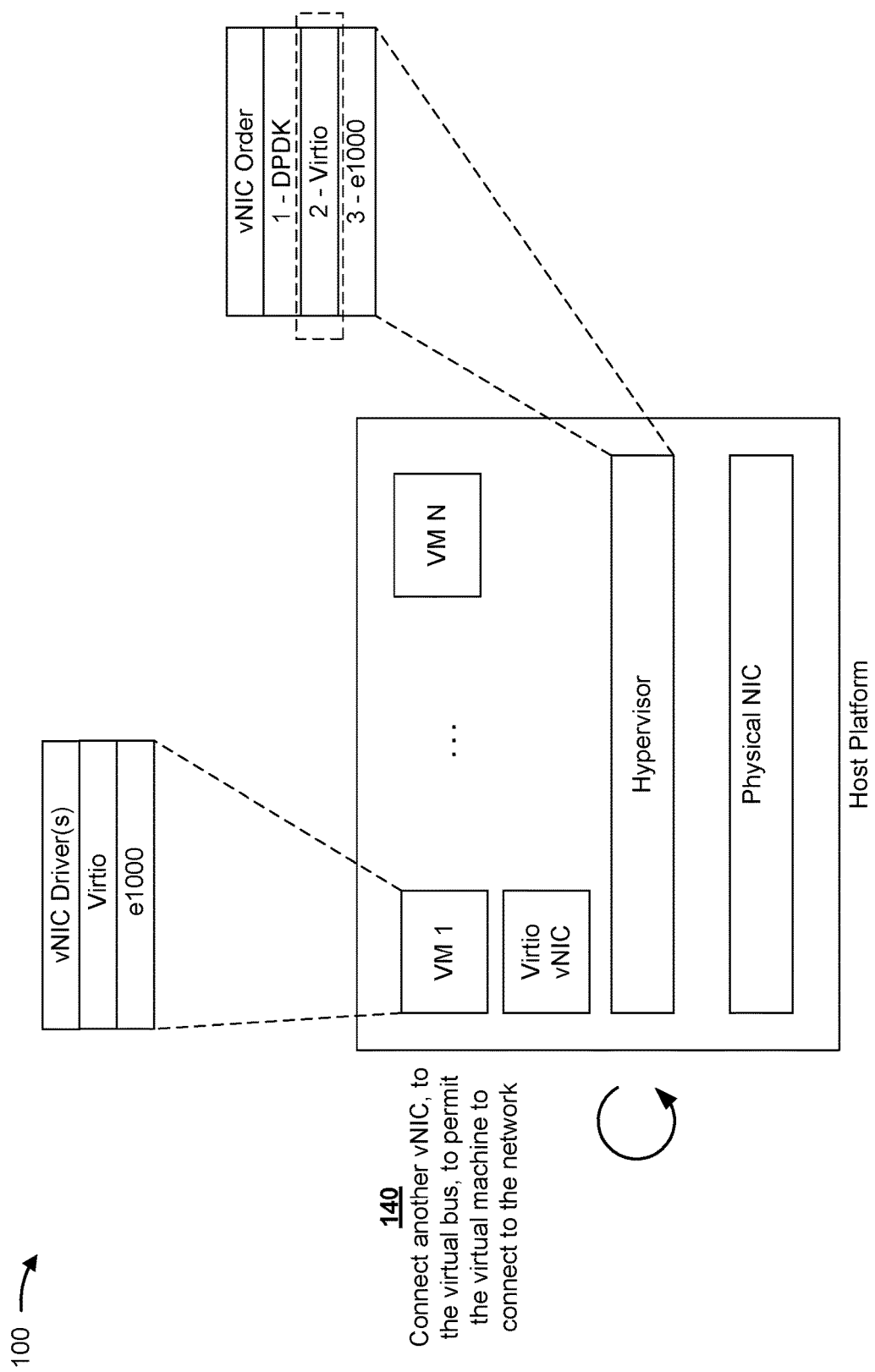

As shown in FIG. 1D, and by reference number 140, the hypervisor may connect, to a virtual bus, another vNIC to permit the virtual machine to connect to the network. For example, the hypervisor may connect, to a virtual bus, a Virtio vNIC based on Virtio being the second type of vNIC to be connected, to a virtual bus, according to the order. In this case, the virtual machine includes a Virtio vNIC driver and is thereby compatible with the Virtio vNIC.

The hypervisor may perform similar operations as described above regarding determining virtual machine and vNIC compatibility. In this case, the hypervisor may determine that the virtual machine is compatible with the Virtio vNIC, and may facilitate and permit the virtual machine to transfer network traffic using the Virtio vNIC, as described below.

Figure 1E:
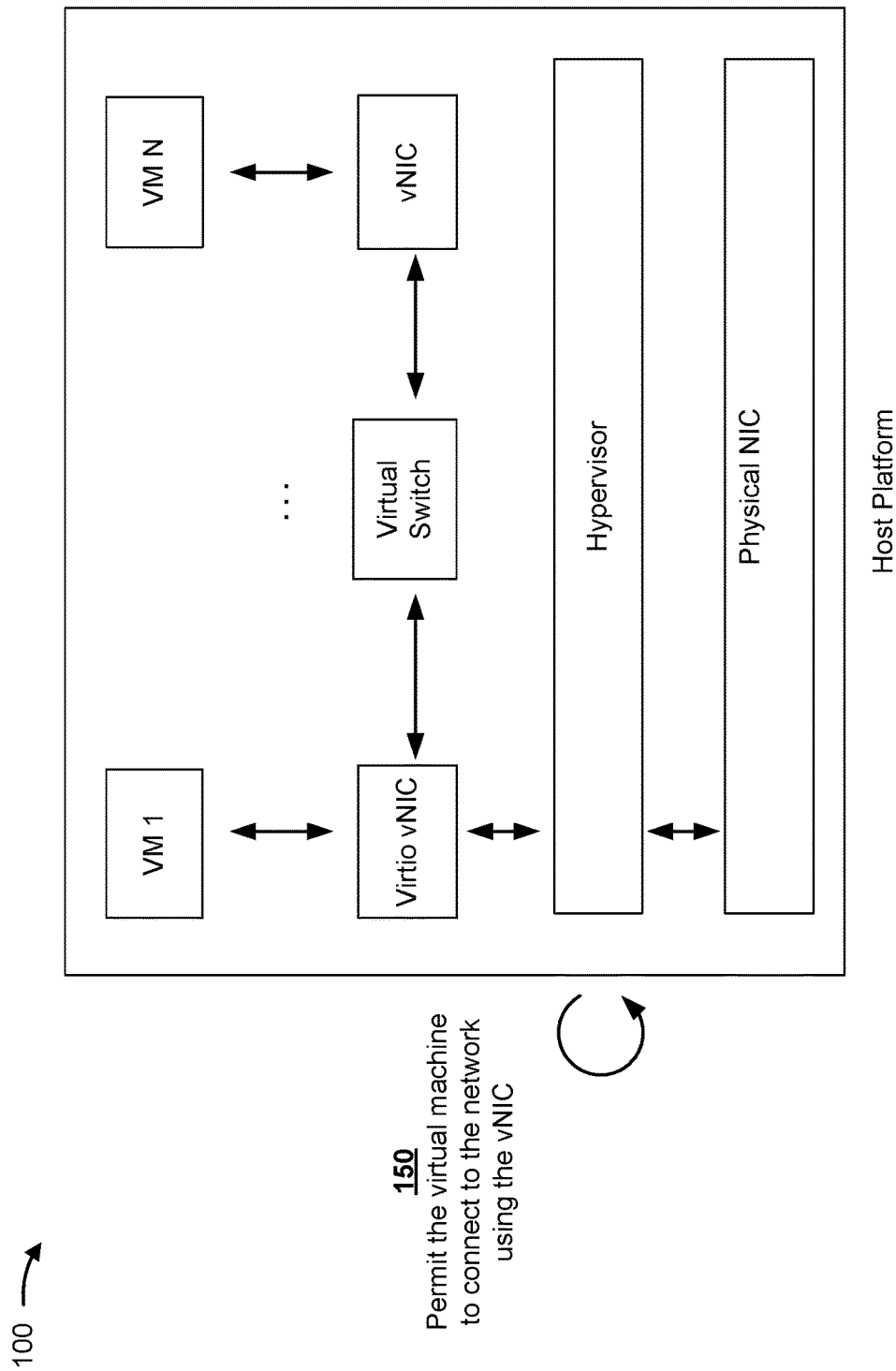

As shown in FIG. 1E, and by reference number 150, the hypervisor may permit the virtual machine to connect to the network using the vNIC. For example, the hypervisor may permit the virtual machine to connect to a virtual network using the vNIC and a virtual switch. The virtual switch may connect a set of virtual machines of the host platform. In this way, different applications, that are executing on different virtual machines, may communicate to implement a vNF to implement a "service chain." Additionally, the hypervisor may permit the virtual machine to connect to a physical network using the vNIC and a physical NIC of the host platform. In this way, the virtual machine may transfer network traffic associated with external devices and/or external applications.

As indicated above, FIGS. 1A-1E are provided merely as an example. Other examples are possible and may differ from what was described with regard to FIGS. 1A-1E.

Figure 2:
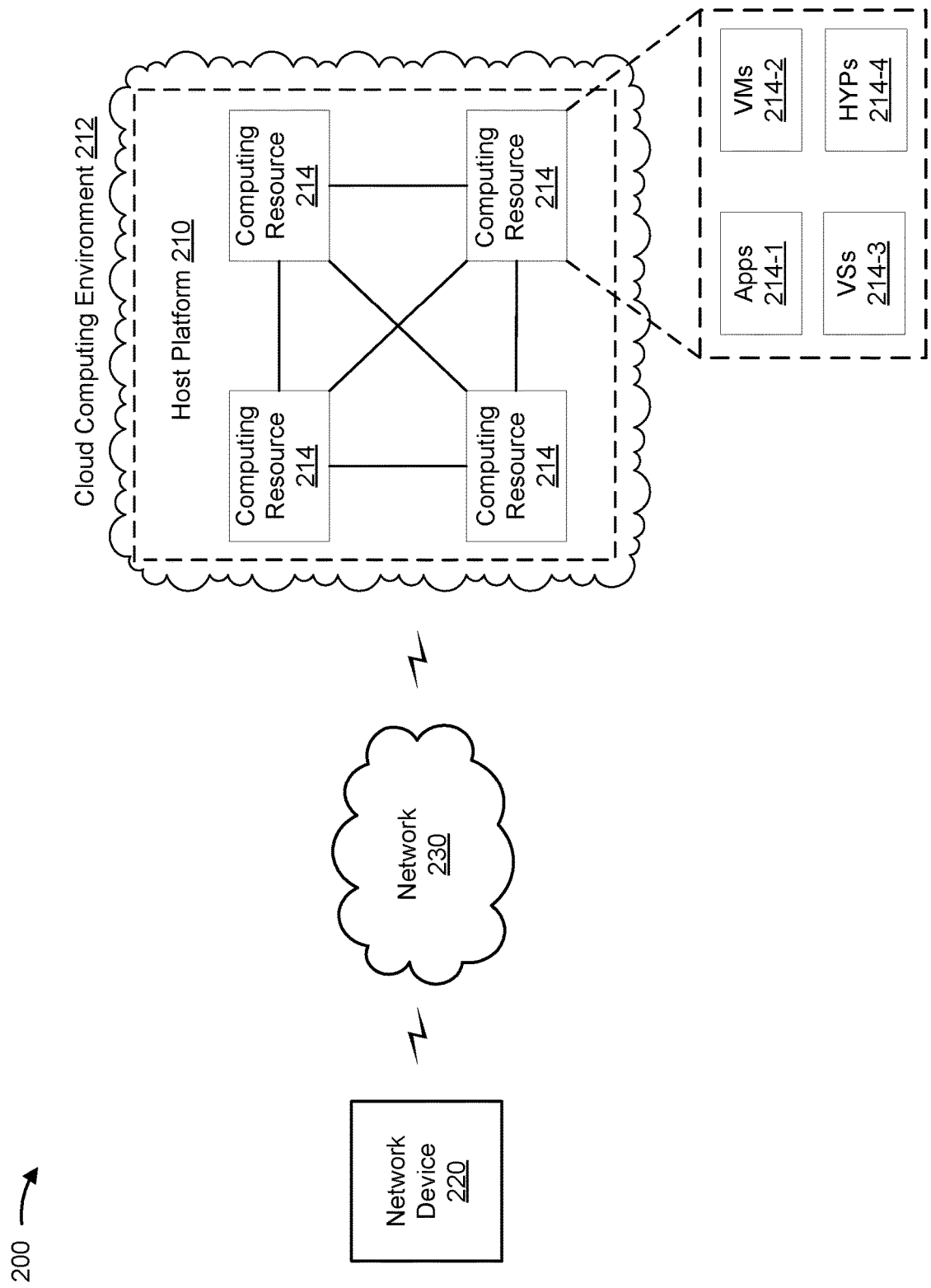
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a host platform 210, a network device 220, and a network 230. Devices of environment 200 may interconnect via wired connections, wireless connections, or a combination of wired and wireless connections.

Host platform 210 includes one or more devices capable of receiving, generating, storing, processing, and/or providing information associated with a vNIC. In some implementations, host platform 210 may be designed to be modular such that certain software components may be swapped in or out depending on a particular need. As such, host platform 210 may be easily and/or quickly reconfigured for different uses.

In some implementations, as shown, host platform 210 may be hosted in cloud computing environment 212. Notably, while implementations described herein describe host platform 210 as being hosted in cloud computing environment 212, in some implementations, host platform 210 might not be cloud-based (i.e., may be implemented outside of a cloud computing environment) or may be partially cloud-based.

Cloud computing environment 212 includes an environment that hosts host platform 210. Cloud computing environment 212 may provide computation, software, data access, storage, etc. services that do not require end-user knowledge of a physical location and configuration of system(s) and/or device(s) that hosts host platform 210. As shown, cloud computing environment 212 may include a group of computing resources 214 (referred to collectively as "computing resources 214" and individually as "computing resource 214").

Computing resource 214 includes one or more personal computers, workstation computers, server devices, or other types of computation and/or communication devices. In some implementations, one or more computing resources 214 may host platform 210. The cloud resources may include compute instances executing in computing resource 214, storage devices provided in computing resource 214, data transfer devices provided by computing resource 214, etc. In some implementations, computing resource 214 may communicate with other computing resources 214 via wired connections, wireless connections, or a combination of wired and wireless connections.

As further shown in FIG. 2, computing resource 214 includes a group of cloud resources, such as one or more applications ("APPs") 214-1, one or more virtual machines ("VMs") 214-2, virtualized storage ("VSs") 214-3, one or more hypervisors ("HYPs") 214-4, and/or the like.

Application 214-1 includes one or more software applications that may be provided to or accessed by external devices (e.g., remote devices, client devices, user devices, and/or the like). Application 214-1 may eliminate a need to install and execute the software applications on remote devices, client devices, user devices, and/or the like. For example, application 214-1 may include software associated with host platform 210 and/or any other software capable of being provided via cloud computing environment 212. In some implementations, one application 214-1 may send/receive information to/from one or more other applications 214-1, via virtual machine 214-2.

Virtual machine 214-2 includes a software implementation of a machine (e.g., a computer) that executes programs like a physical machine. Virtual machine 214-2 may be either a system virtual machine or a process virtual machine, depending upon use and degree of correspondence to any real machine by virtual machine 214-2. A system virtual machine may provide a complete system platform that supports execution of a complete operating system ("OS"). A process virtual machine may execute a single program, and may support a single process. For example, a process virtual machine may support a single process or a group of processes constituting one application. Virtual machines may run natively on a hypervisor. In some implementations, virtual machine 214-2 may execute on behalf of a user, and may manage infrastructure of cloud computing environment 212, such as data management, synchronization, or long-duration data transfers.

Virtualized storage 214-3 includes one or more storage systems and/or one or more devices that use virtualization techniques within the storage systems or devices of computing resource 214. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 214-4 may provide hardware virtualization techniques that allow multiple operating systems (e.g., "guest operating systems") to execute concurrently on a host computer, such as computing resource 214. Hypervisor 214-4 may present a virtual operating platform to the guest operating systems, and may manage the execution of the guest operating systems. Multiple instances of a variety of operating systems may share virtualized hardware resources.

Network device 220 includes one or more devices capable of processing and transferring network traffic. For example, network device 220 may include a router, a gateway, a switch, a firewall, a hub, a bridge, a reverse proxy, a server, a security device, an intrusion detection device, a load balancer, a line card (e.g., in a chassis-based system), or a similar type of device. In some implementations, network device 220 may be a physical device implemented within a housing, such as a chassis, or may be a virtual device implemented by one or more computer devices of a cloud computing environment or a data center.

Network 230 includes one or more wired and/or wireless networks. For example, network 230 may include a cellular network (e.g., a long-term evolution (LTE) network, a code division multiple access (CDMA) network, a third generation (3G) network, a fourth generation (4G) network, a fifth generation (5G) network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
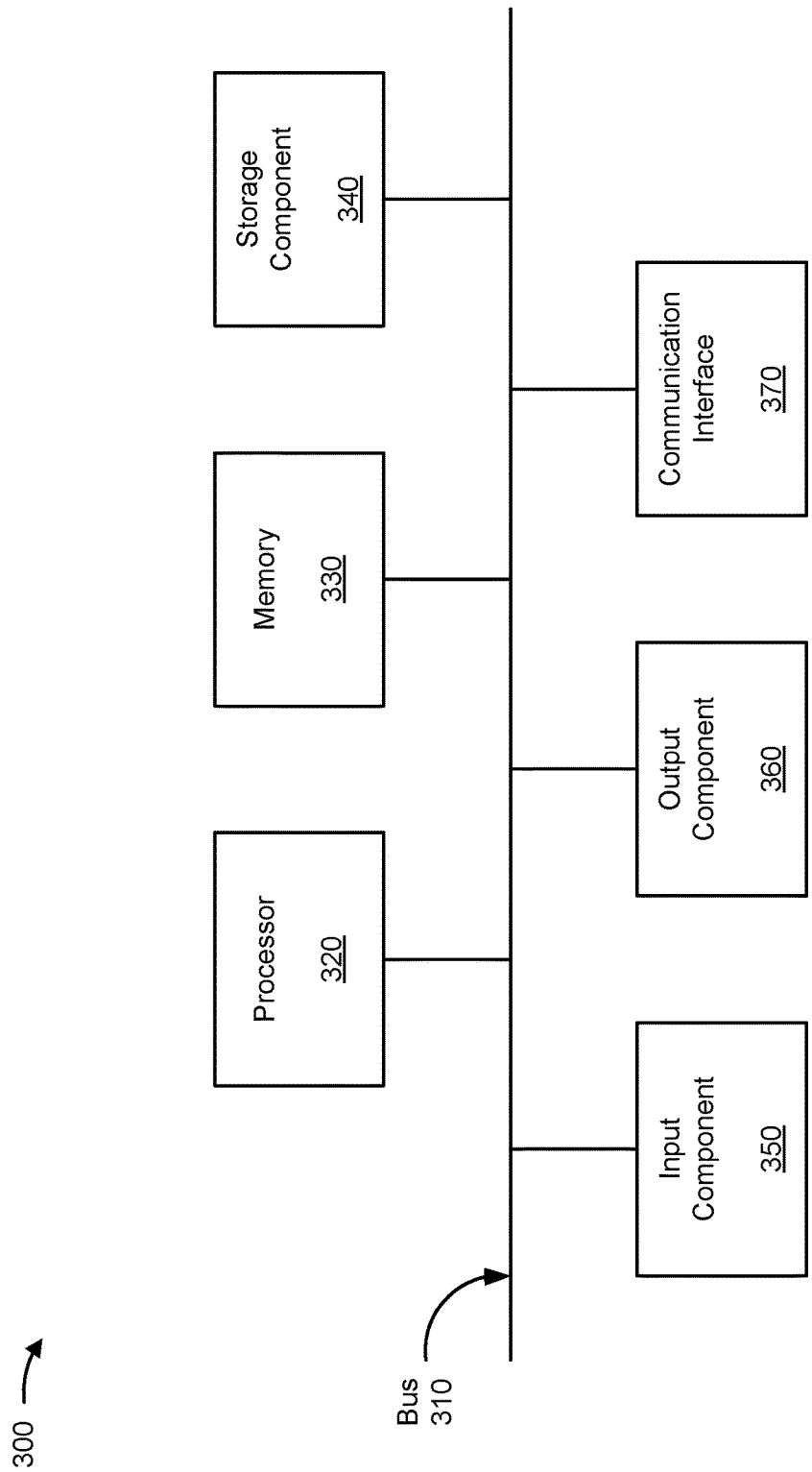
FIG. 3 is a diagram of example components of one or more devices of FIG. 2.

FIG. 3 is a diagram of example components of a device 300. Device 300 may correspond to host platform 210, computing resource 214, and/or network device 220. In some implementations, host platform 210, computing resource 214, and/or network device 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 takes the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
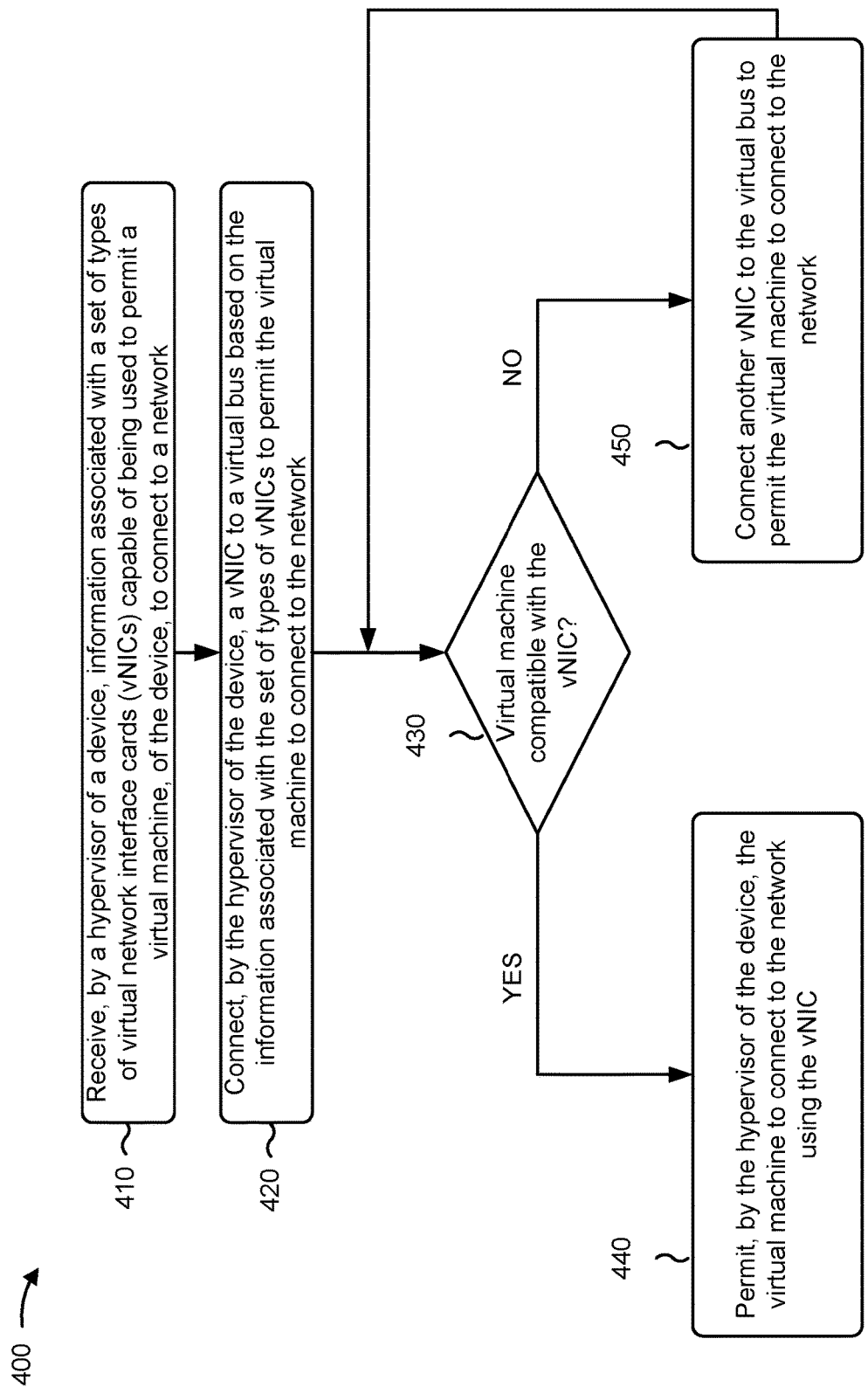
FIG. 4 is a flow chart of an example process for automatically determining virtual machine and virtual network interface compatibility.

FIG. 4 is a flow chart of an example process 400 for automatically determining virtual machine and virtual network interface compatibility. In some implementations, one or more process blocks of FIG. 4 may be performed by host platform 210. In some implementations, one or more process blocks of FIG. 4 may be performed by another device or a group of devices separate from or including host platform 210, such as network device 220.

As shown in FIG. 4, process 400 may include receiving, by a hypervisor of a device, information associated with a set of types of virtual network interface cards (vNICs) capable of being used to permit a virtual machine, of the device, to connect to a network (block 410). For example, hypervisor 214-4, of host platform 210, may receive information associated with a set of types of vNICs that are capable of being connected to a virtual bus, by hypervisor 214-4 to permit a set of virtual machines 214-2, of host platform 210, to connect to a virtual network and/or a physical network.

In some implementations, hypervisor 214-4 may receive information that identifies a set of types of vNICs that hypervisor 214-4 may connect to a virtual bus. For example, types of vNICs may include DPDK vNICs, Virtio vNICs, e1000 vNICs, and/or the like. While particular examples of types of vNICs are used herein, it should be understood that implementations described herein are applicable to other types of vNICs.

In some implementations, hypervisor 214-4 may receive information that identifies an order in which respective types of vNICs are to be connected to a virtual bus. For example, an order may include DPDK, Virtio, and e1000. Continuing with the example, hypervisor 214-4 may initially connect, to a virtual bus, a DPDK vNIC based on the order. In the situation where virtual machine 214-2 is not compatible with the DPDK vNIC, then hypervisor 214-4 may connect, to a virtual bus, a Virtio vNIC based on the order. Continuing with the example, in the situation where virtual machine 214-2 is not compatible with the Virtio vNIC (e.g., in addition to not being compatible with the DPDK vNIC), then hypervisor 214-4 may connect, to a virtual bus, an e1000 vNIC. In other words, the order may indicate a temporal sequence in which the types of vNICs are to be connected to a virtual bus.

In this way, hypervisor 214-4 may attempt to connect virtual machine 214-2 to a network using different types of vNICs. For example, hypervisor 214-4 may not have access to information that identifies vNIC drivers stored by virtual machine 214-2. By attempting different types of vNICs based on the order, hypervisor 214-4 may automatically determine vNIC and virtual machine 214-2 compatibility.

In some implementations, hypervisor 214-4 may receive information that identifies a particular order. For example, a network operator might configure hypervisor 214-4 to connect, to a virtual bus, vNICs in association with a particular order. Additionally, or alternatively, hypervisor 214-4 may determine an order randomly, determine an order based on a model, determine an order based on a particular type of vNIC being compatible with a threshold number of other virtual machines 214-2 of host platform 210, and/or the like.

In some implementations, the order may be based on capabilities of the respective types of vNICs, supported features of the respective types of vNICs, resource utilization and/or requirements of the respective types of vNICs, and/or the like. As an example, a network operator might desire that virtual machines 214-2 connect to a network using a particular type of vNIC that offers improved network performance (e.g., increased throughput, reduced latency, and/or the like), consumes fewer resources, and/or the like, than as compared to other types of vNICs.

In some implementations, hypervisor 214-4 may receive the information associated with the types of vNICs based on an input from a client device (e.g., which may have received an input from a network operator), based on a time frame, based on a configuration file, based on being connected to a network, based on being powered-on, and/or the like.

In this way, hypervisor 214-4 may connect, to a virtual bus, a vNIC, that is of a particular type, based on the information associated with the set of types of vNICs, as described below.

While some implementations herein describe a particular type of virtual device (e.g., vNICS), it should be understood that implementations described herein are applicable to other types of virtual devices, such as storage devices, peripheral devices, and/or any other type of device that is capable of connecting to a virtual bus.

As further shown in FIG. 4, process 400 may include connecting, by the hypervisor of the device, a vNIC to a virtual bus based on the information associated with the set of types of vNICs to permit the virtual machine to connect to the network (block 420). For example, hypervisor 214-4 may connect, to a virtual bus, a vNIC based on the order associated with the set of types of vNICs.

In some implementations, hypervisor 214-4 may connect, to a virtual bus, a vNIC based on creating virtual machine 214-2, based on virtual machine 214-2 booting, based on virtual machine 214-2 executing an application associated with a vNF, and/or the like. Additionally, or alternatively, hypervisor 214-4 may connect, to a virtual bus, a vNIC based on an instruction received from another device, based on a configuration file, based on a time frame, and/or the like.

In some implementations, hypervisor 214-4 may determine a particular type of vNIC to connect, to a virtual bus, based on the order. As an example, assume that the order includes three types of vNICs, such as DPDK, Virtio, and e1000. In this case, hypervisor 214-4 may connect, to a virtual bus, a DPDK vNIC based on DPDK being the first type of vNIC according to the order.

In some implementations, hypervisor 214-4 may determine a particular type of vNIC to connect, to a virtual bus, based on an instruction from virtual machine 214-2. For example, virtual machine 214-2 may determine a particular type of vNIC that is supported by virtual machine 214-2, and may provide an instruction to hypervisor 214-4 that causes hypervisor 214-4 to connect, to a virtual bus, a vNIC of the particular type. In some implementations, virtual machine 214-2 may include a driver selection module that is capable of determining a type of vNIC that is compatible with virtual machine 214-2.

In some implementations, virtual machine 214-2 (e.g., the driver selection module) may determine types of vNICs that hypervisor 214-4 is capable of connecting to a virtual bus. For example, virtual machine 214-2 may read from a set of configuration space registers of other vNICs of host platform 210, and determine types of vNICs that hypervisor 214-4 has connected, to a virtual bus, for use by other virtual machines 214-2 of host platform 210. Additionally, or alternatively, virtual machine 214-2 may provide, to hypervisor 214-4, an instruction that causes hypervisor 214-4 to connect, to a virtual bus, a particular type of vNIC.

In this way, some implementations described herein reduce a number of situations where hypervisor 214-4 connects, to a virtual bus, a vNIC that is incompatible with virtual machine 214-2 and/or reduces a number of vNICs that hypervisor 214-4 might need to connect, to a virtual bus, to identify compatibility with virtual machine 214-2. In this way, some implementations described herein conserve processor and/or memory resources of host platform 210.

In some implementations, hypervisor 214-4 may connect, to a virtual bus, a vNIC in accordance with a specification of the type of vNIC. As examples, hypervisor 214-4 may connect, to a virtual bus, a DPDK vNIC in accordance with DPDK specifications, may connect, to a virtual bus, a Virtio vNIC in accordance with Virtio specifications, etc. In other words, hypervisor 214-4 may connect, to a virtual bus, a particular vNIC that is capable of being configured and/or operated by a corresponding vNIC driver (e.g., a DPDK vNIC driver may operate a DPDK vNIC, a Virtio driver may operate a Virtio vNIC, etc.).

In some implementations, hypervisor 214-4 may assign a network address (e.g., a MAC address, an Internet protocol (IP) address, and/or the like) to the vNIC based on connecting, to a virtual bus, the vNIC. Additionally, or alternatively, hypervisor 214-4 may connect the vNIC to a virtual network device (e.g., a switch, a bridge, and/or the like) to permit the vNIC to transfer network traffic to other virtual machines 214-2 associated with a virtual network of host platform 210.

In some implementations, hypervisor 214-4 may connect the vNIC to a physical NIC of host platform 210 to permit the vNIC to transfer network traffic associated with a physical network to which host platform 210 is connected. Additionally, or alternatively, hypervisor 214-4 may connect the vNIC to a virtual bus (e.g., a peripheral component interconnect (PCI) bus, a PCI express (PCI-e) bus, and/or the like) to permit virtual machine 214-2 to detect that the vNIC is capable of being used by the vNIC.

In some implementations, hypervisor 214-4 may store, in a data structure, an entry that corresponds to the vNIC based on connecting the vNIC to a virtual bus. For example, the entry may include a vNIC identifier, such as an identifier that uniquely identifies the vNIC. Additionally, or alternatively, the entry may include a virtual machine identifier, such as an identifier that uniquely identifies virtual machine 214-2.

In some implementations, the entry may include an order identifier, such as an identifier that identifies the order associated with the types of vNICs. For example, the order identifier may identify the order in which the vNICs are to be connected to a virtual bus (e.g., DPDK, Virtio, e1000, and/or the like). Additionally, or alternatively, the entry may include a vNIC type identifier, that identifies a type of vNIC that was connected to a virtual bus. For example, a DPDK vNIC may be associated with a particular vNIC type identifier, a Virtio vNIC may be associated with another vNIC type identifier, and/or the like.

In some implementations, the entry may include a status identifier, that identifies a status of the vNIC. For example, hypervisor 214-4 may determine a status of the vNIC, and update the entry based on the status. In some implementations, a first status may correspond to the vNIC being connected to a virtual bus, and may be associated with a first value (e.g., −1). Additionally, or alternatively, a second status may correspond to the vNIC being detected by virtual machine 214-2, and may be associated with a second value (e.g., 0). Additionally, or alternatively, a third status may correspond to virtual machine 214-2 (e.g., a vNIC driver of virtual machine 214-2) configuring the vNIC for use by virtual machine 214-2, and may be associated with a third value (e.g., 1). In some implementations, hypervisor 214-4 may determine a status, a change in status, and/or the like, of the vNIC, and may update the entry in the data structure.

In some implementations, the entry may include information associated with a set of time stamps. For example, hypervisor 214-4 may store information associated with time stamps that correspond to respective statuses of the vNIC. For example, hypervisor 214-4 may store a first time stamp that corresponds to a time at which the vNIC is associated with the first status, may store a second time stamp that corresponds to a time at which the vNIC is associated with the second status, and/or the like. In this way, and as described elsewhere herein, hypervisor 214-4 may use the time stamps to determine whether virtual machine 214-2 is compatible with the vNIC.

In this way, hypervisor 214-4 may connect, to a virtual bus, a vNIC that might permit virtual machine 214-2 to connect to a virtual network and/or physical network. As described below, hypervisor 214-4 may determine whether virtual machine 214-2 is compatible with the vNIC, and selectively connect, to a virtual bus, another vNIC (or another set of vNICs) based on determining whether virtual machine 214-2 is compatible with the vNIC.

As further shown in FIG. 4, process 400 may include determining, by the hypervisor of the device, whether the virtual machine is compatible with the vNIC (block 430). For example, hypervisor 214-4 may determine whether virtual machine 214-2 includes a vNIC driver that is capable of configuring the vNIC for use by virtual machine 214-2 and/or operating the vNIC to permit virtual machine 214-2 to transfer network traffic associated with a virtual network and/or physical network.

In some implementations, hypervisor 214-4 may determine whether virtual machine 214-2 is compatible with the vNIC based on a set of statuses of the vNIC and/or a set of time stamps associated with the set of statuses, as described below.

In some implementations, hypervisor 214-4 may set a first status of the vNIC based on connecting the vNIC to a virtual bus. Additionally, or alternatively, hypervisor 214-4 may store, in a data structure, information associated with a time stamp that identifies a time at which hypervisor 214-4 sets the first status. For example, hypervisor 214-4 may update the entry to include the time stamp.

In some implementations, hypervisor 214-4 may set a second status of the vNIC based on virtual machine 214-2 detecting the vNIC. Additionally, or alternatively, hypervisor 214-4 may store, in the data structure, information associated with a time stamp that identifies a time at which hypervisor 214-4 sets the second status. Additionally, or alternatively, hypervisor 214-4 may start a timer based on setting the second status. For example, hypervisor 214-4 may update the entry to include the time stamp and/or information associated with the timer.

In some implementations, hypervisor 214-4 may determine that virtual machine 214-2 detected the vNIC based on an update to a register of the vNIC. In some implementations, virtual machine 214-2 (e.g., a kernel of virtual machine 214-2) may detect that the vNIC is connected to a virtual bus based on implementing a PCI discovery process, based on receiving an interrupt, and/or the like. Additionally, or alternatively, virtual machine 214-2 may write to a set of registers based on detecting that the vNIC is connected to the virtual bus. For example, virtual machine 214-2 may write to a set of configuration space registers to reset values associated with the configuration space registers. Additionally, or alternatively, virtual machine 214-2 may write to the configuration space registers to permit a vNIC driver of virtual machine 214-2 to configure the vNIC for operation by virtual machine 214-2. As examples, virtual machine 214-2 may write to a set of configuration space registers, such as a command register, a status register, a cache line register, an interrupt line register, and/or the like.

In some implementations, hypervisor 214-4 may determine that virtual machine 214-2 (e.g., the kernel of virtual machine 214-2) wrote to the configuration space registers, and may set the second status of the vNIC. For example, hypervisor 214-4 may determine that virtual machine 214-2 updated a set of registers.

In some implementations, the vNIC may be associated with an un-initialized state based on being connected to the virtual bus, based on the configuration registers being written to by virtual machine 214-2, and/or the like. In some implementations, the un-initialized state may refer to a state of the vNIC whereby the vNIC is awaiting configuration by a vNIC driver of virtual machine 214-2.

In some implementations, virtual machine 214-2 (e.g., the kernel of virtual machine 214-2) may request a set of vNIC drivers of virtual machine 214-2 to attempt to configure the vNIC such that the vNIC is associated with an active state. In some implementations, the active state may refer to a state of the vNIC whereby the vNIC is capable of being used by virtual machine 214-2 to transfer network traffic associated with a network.

In some implementations, a vNIC driver of virtual machine 214-2 may attempt to cause the vNIC to be associated with the active state. For example, a vNIC driver, or a set of vNIC drivers, of virtual machine 214-2 may read from configuration space registers of the vNIC and/or may write to configuration space registers to cause the vNIC to enter the active state. For example, a vNIC driver may read from a device identifier register, a vendor identifier register, a status identifier register, and/or the like, to determine whether the vNIC is compatible with the vNIC driver.

In some implementations, and in situations where the vNIC is compatible with the vNIC driver, then virtual machine 214-2 may write to a set of configuration space registers to configure the vNIC for operation by virtual machine 214-2. For example, virtual machine 214-2 (e.g., a vNIC driver) may write to a set of command registers, such as a memory space enable register, an input/output (I/O) space enable register, a bus master enable register, and/or the like. In this case, the vNIC may be associated with an active state based on the vNIC driver writing to the set of configuration space registers.

In some implementations, and in situations where the vNIC is not compatible with the vNIC driver, then virtual machine 214-2 may refrain from writing to the set of configuration space registers. In this case, the vNIC may not be associated with the active state, and may thereby remain in an un-initialized state.

In some implementations, hypervisor 214-4 may set a third status of the vNIC based on the vNIC being associated with the active state. For example, the third status may identify that the vNIC is configured for use by virtual machine 214-2 to transfer network traffic.

In some implementations, hypervisor 214-4 may determine that virtual machine 214-2 is compatible with the vNIC based on determining that the vNIC is associated with the active state. For example, hypervisor 214-4 may determine that virtual machine 214-2 is compatible with the vNIC in situations where the vNIC is associated with the active state.

In some implementations, hypervisor 214-4 may determine that virtual machine 214-2 is not compatible with the vNIC based on a time frame. For example, hypervisor 214-4 may determine that a threshold amount of time has elapsed since the vNIC was detected by virtual machine 214-2. In some implementations, hypervisor 214-4 may compare a timestamp associated with the vNIC being detected by virtual machine 214-2 and a current time, and determine that the threshold amount of time has elapsed based on the comparison.

By determining that the threshold amount of time has elapsed since virtual machine 214-2 detected the vNIC, hypervisor 214-4 may determine that virtual machine 214-2 does not include a vNIC driver that is compatible with the vNIC. In other words, a vNIC driver should have configured the vNIC for operation within the threshold amount of time.

In this way, hypervisor 214-4 may determine whether virtual machine 214-2 is compatible with the vNIC, and may selectively connect, to a virtual bus, another type of vNIC based on virtual machine 214-2 being compatible with the VNIC or not being compatible with the vNIC, as described below.

As further shown in FIG. 4, if the virtual machine is compatible with the vNIC (block 430—YES), then process 400 may include permitting, by the hypervisor of the device, the virtual machine to connect to the network using the vNIC (block 440). For example, hypervisor 214-4 may permit virtual machine 214-2 to use the vNIC to transfer network traffic associated with a virtual network and/or a physical network in the situation where virtual machine 214-2 is compatible with the vNIC.

In this way, hypervisor 214-4 may permit virtual machine 214-2 to use the vNIC to transfer network traffic associated with a virtual network and/or a physical network. By connecting, to a virtual bus, the vNIC based on the order, hypervisor 214-4 may connect a particular type of vNIC that consumes fewer processor and/or memory resources of host platform 210, permits increased throughput, permits reduced latency, and/or the like, as compared to other types of vNICs that hypervisor 214-4 is capable of connecting, to a virtual bus, and/or that are associated with a lower rank according to the order. In this way, some implementations conserve processor and/or memory resources of host platform 210 and/or permit improved network performance.

As further shown in FIG. 4, if the virtual machine is not compatible with the vNIC (block 430—NO), then process 400 may include connecting another vNIC to the virtual bus to permit the virtual machine to connect to the network (block 450). For example, hypervisor 214-4 may connect, to a virtual bus, another type of vNIC in the situation where hypervisor 214-4 determines that virtual machine 214-2 (e.g., a vNIC driver) is not compatible with the vNIC.

In some implementations, hypervisor 214-4 may hot swap vNICs based on determining that the vNIC, that was previously connected to the virtual bus, is not compatible with virtual machine 214-2. For example, hypervisor 214-4 may connect, to a virtual bus, another vNIC and attempt to connect the vNIC to virtual machine 214-2 while virtual machine 214-2 is running.

In some implementations, hypervisor 214-4 may remove the vNIC that was connected to a virtual bus, in association with block 420. For example, hypervisor 214-4 may remove data structures that were generated, release resources that were allocated to the vNIC, remove connections that were established for the vNIC, and/or the like.

In some implementations, hypervisor 214-4 may connect, to a virtual bus, another vNIC based on the order described above in connection with block 410. For example, hypervisor 214-4 may identify a particular type of vNIC to connect, to a virtual bus, based on the order, and may connect, to a virtual bus, a vNIC of the particular type. In some implementations, hypervisor 214-4 may search a data structure, identify the entry associated with virtual machine 214-2, and identify a type of vNIC to be connected, to a virtual bus, based on the entry. As an example, assume that the order includes DPDK, Virtio, and e1000. Further, assume that virtual machine 214-2 does not support DPDK vNICs (e.g., does not include a DPDK vNIC driver). In this case, hypervisor 214-4 may connect, to a virtual bus, a Virtio vNIC, and determine whether virtual machine 214-2 is compatible with the Virtio vNIC. In some implementations, hypervisor 214-4 may update the entry based on connecting, to a virtual bus, the vNIC.

In some implementations, hypervisor 214-4 may perform operations described above in connection with block 430 based on connecting, to a virtual bus, the vNIC. For example, hypervisor 214-4 may determine whether virtual machine 214-2 is compatible with the vNIC. In some implementations, hypervisor 214-4 may determine that none of the types of vNICs that hypervisor 214-4 is capable of connecting, to a virtual bus, are compatible with virtual machine 214-2. In this case, hypervisor 214-4 may provide a notification to another device, may log an error, may prevent virtual machine 214-2 from being placed into a pool of available virtual machines, prevent virtual machine 214-2 from being marked as active, and/or the like.

In this way, hypervisor 214-4 may attempt to connect virtual machine 214-2 to a network using a first type of vNIC. In the event that virtual machine 214-2 is not compatible with the first type of vNIC, then hypervisor 214-4 may connect, to a virtual bus, a second type of vNIC and attempt to connect virtual machine 214-2 to the second type of vNIC. Hypervisor 214-4 may repeat the process for n types of vNICs (e.g., where n≥1). In this way, hypervisor 214-4 may automatically determine vNIC and virtual machine 214-2 compatibility by iteratively attempting to connect virtual machine 214-2 to different types of vNICs.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Some implementations described herein reduce an amount of manual configuration of vNFs by providing a hypervisor that can automatically determine virtual machine and vNIC compatibility. Additionally, some implementations described herein improve network performance by providing a hypervisor that can connect, to a virtual bus, types of vNICs that offer improved throughput, reduced latency, etc. than as compared to other types of vNICs.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A device, comprising:
a memory; and
one or more processors to:
receive information associated with a set of types of virtual network interface cards (vNICs),
a hypervisor, of the device, being capable of connecting a vNIC, to a virtual bus, to connect a virtual machine, of the device, to a network;
connect the vNIC, to the virtual bus, based on the information associated with the set of types of vNICs,
the vNIC being associated with a type of the set of types;
determine that the virtual machine detected the vNIC after connecting the vNIC to the virtual bus;
determine a difference between a current time and a time at which the virtual machine detected the vNIC; and
determine whether a threshold amount of time has elapsed based on whether the difference satisfies the threshold amount of time;
determine whether the virtual machine is compatible with the vNIC based on whether the threshold amount of time has elapsed; and
selectively connect another vNIC, to the virtual bus, based on determining whether the virtual machine is compatible with the vNIC,
the other vNIC being associated with another type of the set of types, and
the other type being different than the type.

2. The device of claim 1,
where, when determining whether the virtual machine is compatible with the vNIC, the one or more processors are to:
determine that the virtual machine is not compatible with the vNIC; and
where the one or more processors, when selectively connecting the other vNIC, to the virtual bus, based on determining whether the virtual machine is compatible with the vNIC, are to:
connect the other vNIC, to the virtual bus, based on determining that the virtual machine is not compatible with the vNIC.

3. The device of claim 1, where the one or more processors are further to:
report an error in an event that none of the set of types of vNICs are compatible with the virtual machine.

4. The device of claim 1, where the one or more processors are further to:
connect the vNIC to the network, that includes a set of virtual machines of the device, to permit the virtual machine to implement a virtualized network function, the set of virtual machines including the virtual machine.

5. The device of claim 1, where the one or more processors are further to:
receive information that identifies an order in which the set of types of vNICs are to be connected to the virtual bus; and
where the one or more processors, when connecting the vNIC to the virtual bus, are to:
connect the vNIC to the virtual bus based on the order.

6. The device of claim 1, where the one or more processors are further to:
determine that a vNIC driver, of the virtual machine, configured the vNIC for operation; and
where the one or more processors, when determining whether the virtual machine is compatible with the vNIC, are to:
determine that the virtual machine is compatible with the vNIC based on determining that the vNIC driver configured the vNIC for operation.

7. A non-transitory computer-readable medium storing instructions,
the instructions comprising:
one or more instructions that, when executed by one or more processors of a device, cause the one or more processors to:
receive information associated with an order that identifies a set of types of virtual network interface cards (vNICs),
a hypervisor, associated with the device, being capable of connecting a vNIC, to a virtual bus, to permit a virtual machine, of the device, to connect to a network;
connect vNIC to the virtual bus based on the order, the vNIC being associated with a type of the set of types;
determine that the virtual machine detected the vNIC after connecting the vNIC to the virtual bus;
determine a difference between a current time and a time at which the virtual machine detected the vNIC; and
determine whether a threshold amount of time has elapsed based on whether the difference satisfies the threshold amount of time;
determine whether the virtual machine is compatible with the vNIC based on whether the threshold amount of time has elapsed; and
selectively connect another vNIC to the virtual bus based on the order and based on determining whether the virtual machine is compatible with the vNIC,
the other vNIC being associated with another type of the set of types, and
the other type being different than the type.

8. The non-transitory computer-readable medium of claim 7, where the one or more instructions, when executed by the one or more processors, further cause the one or more processors to:
assign a network address to the vNIC to permit the vNIC to connect to the network.

9. The non-transitory computer-readable medium of claim 7, where the one or more instructions, when executed by the one or more processors, further cause the one or more processors to:
    determine that the virtual machine does not include a vNIC driver that is compatible with the vNIC; and
    where the one or more instructions, that cause the one or more processors to determine whether the virtual machine is compatible with the vNIC, cause the one or more processors to:
        determine that the virtual machine is not compatible with the vNIC based on determining that the virtual machine does not include the vNIC driver that is compatible with the vNIC.

10. The non-transitory computer-readable medium of claim 7, where the one or more instructions, when executed by the one or more processors, further cause the one or more processors to:
    determine that the virtual machine includes a vNIC driver that is compatible with the vNIC; and
    where the one or more instructions, that cause the one or more processors to determine whether the virtual machine is compatible with the vNIC, cause the one or more processors to:
        determine that the virtual machine is compatible with the vNIC based on determining that the virtual machine includes the vNIC driver that is compatible with the vNIC.

11. The non-transitory computer-readable medium of claim 7, where the one or more instructions, when executed by the one or more processors, further cause the one or more processors to:
    determine that the virtual machine updated a register of the vNIC; and
    where the one or more instructions, that cause the one or more processors to determine whether the virtual machine is compatible with the vNIC, cause the one or more processors to:
        determine that the virtual machine is compatible with the vNIC based on determining that the virtual machine updated the register of the vNIC.

12. The non-transitory computer-readable medium of claim 7, where the other vNIC is not connected to the virtual bus based on determining that the vNIC is compatible with the virtual machine.

13. A method, comprising:
    receiving, by a hypervisor of a device, information associated with a set of types of virtual devices,
        the hypervisor being capable of connecting a virtual device, to a virtual bus, to permit a virtual machine, of the device, to connect to a network;
    connecting, by the hypervisor of the device, the virtual device to the virtual bus based on the information associated with the set of types of virtual devices,
        the virtual device being associated with a type of the set of types;
    determining, by the hypervisor of the device, that the virtual machine detected the virtual device after connecting the virtual device to the virtual bus;
    determining, by the hypervisor of the device, a difference between a current time and a time at which the virtual machine detected the virtual device;
    determining, by the hypervisor of the device, whether a threshold amount of time has elapsed based on whether the difference satisfies the threshold amount of time;
    determining, by the hypervisor of the device, whether the virtual machine is compatible with the virtual device based on whether the threshold amount of time has elapsed; and
    selectively connecting, by the hypervisor of the device, another virtual device to the virtual bus based on determining whether the virtual machine is compatible with the virtual device,
        the other virtual device being associated with another type of the set of types, and
        the other type being different than the type.

14. The method of claim 13, where virtual device is a virtual network interface card (vNIC).

15. The method of claim 13,
    where determining whether the virtual machine is compatible with the virtual device comprises:
        determining that the virtual machine is not compatible with the virtual device; and
    where selectively connecting the other virtual device to the virtual bus comprises:
        connecting the other virtual device to the virtual bus based on determining that the virtual machine is not compatible with the virtual device.

16. The method of claim 13, further comprising:
    receiving information that identifies an order in which types of virtual devices, of the set of types of virtual devices, are to be connected to the virtual bus; and
    where connecting the virtual device to the virtual bus comprises:
        connecting the virtual device to the virtual bus further based on the order.

17. The method of claim 13, where the virtual device is a storage device.

18. The method of claim 13, further comprising:
    receiving information that identifies an update to a register of the virtual device; and
    where determining whether the virtual machine is compatible with the virtual device comprises:
        determining that the virtual machine is compatible with the virtual device based on the information that identifies the update to the register.

19. The device of claim 1, where the VNIC includes capabilities that support data plane development kit communications.

20. The method of claim 13, where the virtual device is a data plane development kit virtual network interface card.

* * * * *